Figure 1:
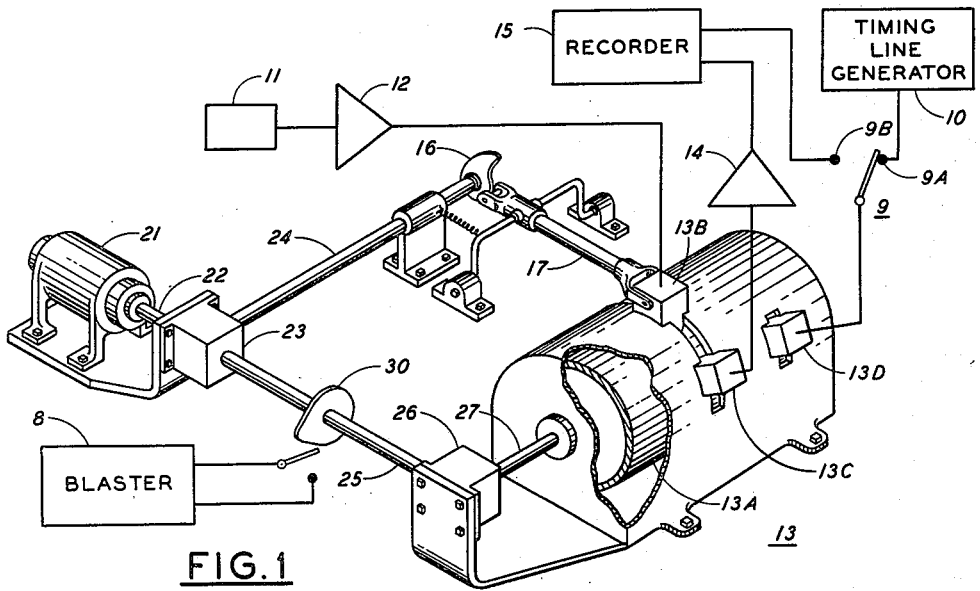

June 10, 1958

O. A. FREDRIKSSON 2,838,743

NORMAL MOVEOUT CORRECTION WITH COMMON DRIVE
FOR RECORDING MEDIUM AND RECORDER
AND/OR REPRODUCING MEANS

Filed April 5, 1955

INVENTOR
OKE A. FREDRIKSSON
BY
ATTORNEYS

United States Patent Office 2,838,743
Patented June 10, 1958

2,838,743

NORMAL MOVEOUT CORRECTION WITH COMMON DRIVE FOR RECORDING MEDIUM AND RECORDER AND/OR REPRODUCING MEANS

Oke A. Fredriksson, Fullerton, Calif., assignor to California Research Corporation, San Francisco, Calif., a corporation of Delaware Application April 5, 1955, Serial No. 499,355

3 Claims. (Cl. 340—15)

This invention relates in general to seismic prospecting and relates more specifically to methods of and apparatus for analyzing data obtained in such prospecting.

In the reflection method of seismic prospecting, energy from an artificial seismic disturbance is reflected from various subsurface strata back to seismic wave detectors at or near the surface of the earth. These detectors convert the received energy into corresponding output signals which are amplified and then recorded for analysis. Usually, the seismic wave detectors are spaced different distances from the location of the seismic disturbance so that energy reflected from a given reflecting horizon arrives at the different detectors at different times, resulting in time shifts of corresponding signal portions of the different seismic traces. These time shifts which are caused by the different spacings of the detectors are commonly referred to as normal moveout and they tend to obscure alignments of corresponding signal portions across the traces, thus making it difficult to accurately determine the presence of a reflecting horizon. Additionally, where the seismic traces are to be combined or mixed into a single trace in which the signal portions of the mixed traces reinforce each other and the extraneous energy or noise portions tend to randomize or cancel, the presence in the mixed traces of the normal moveout time variations prevents accurate alignment of corresponding signal portions across the traces, thus resulting in a less than optimum reinforcement of the corresponding signal portions in the resultant mixed trace.

The normal moveout time varies in magnitude during the seismic disturbance, being largest immediately after the disturbance, when the differences in distances of the travel paths to the different detectors for energy from a given reflecting horizon are largest, and decreasing in magnitude as these differences decrease for successively deeper reflecting horizons. The exact manner in which the normal moveout time varies as a function of the time after the disturbance will, of course, depend on the spacings of the different detectors and the particular velocity function obtaining in the surveyed area.

Heretofore, numerous methods and apparatus have been proposed for removing the normal moveout time variations from seismic traces, but none has been particularly successful. With the advent of reproducible recording in seismic prospecting, a number of methods have been proposed for removing normal moveout by effecting relative shifts in the positions of the recording or reproducing heads relative to the recording medium to produce relative time shifts in the recorded or reproduced traces. In one of such methods, the reproducibly recorded traces are reproduced a plurality of times and the reproducing heads are shifted different amounts for each reproduction to produce normal moveout compensation for a given reflection on each reproduction. However, this method has the disadvantage that it requires a reproduction of the traces, and the consequent shifting of the reproducing heads, for every reflection of interest, thus rendering the operation very time consuming from a record processing standpoint. This method has the further disadvantage that if the reproduced traces are to be mixed, only that signal portion of each trace corresponding to the reflection for which normal moveout has been removed will produce optimum reinforcement when mixed.

An additional method sometimes utilized to remove normal moveout is to continuously move each of the recording or reproducing heads relative to the recording medium during either recording or reproducing of the traces to continuously vary the time sequences of the traces in an attempt to provide the desired correction. The movement of the heads is controlled by some type of a programmer, such as a series of cams which are driven separately from the recording medium, or a servo system which generates an output corresponding to the desired correction. However, the problem is complicated by the fact that the required normal moveout correction varies nonlinearly with respect to the time elapsing after the disturbance, the required correction being largest immediately after the disturbance, when the differences in the distance of the travel paths to the different detectors for a given reflection are largest, and decreasing nonlinearly with time as these differences decrease. An additional complicating consideration is that the instantaneous values of the required correction vary nonlinearly from detector to detector, particularly at the start of the record when the required correction is large.

One of the approaches utilized in this continuous correction method is to mount the reproducing heads at spaced-apart points along a member which overlies the recording medium and which is pivoted at one end for movement relative to the time axis of the recording medium. This movement is nonlinearly programmed or controlled during reproduction in an attempt to obtain the required correction. However, even if the desired nonlinear variations in the velocity of the mounting member are obtained, the corrections produced thereby are not exact because the heads are linearly disposed along the mounting member and thus cannot provide the required nonlinear variations from trace to trace of the instantaneous values of the correction. This linearity is particularly objectionable at the start of the record where the required correction varies quite nonlinearly from trace to trace and the error introduced by a linear arrangement of the heads is quite substantial.

In the use of the above types of programmers, the output produced thereby is generated as a fucntion of time which is supposed to correspond to movement of the recording medium as a function of time. That is, at any instant during movement of the recording medium in the moveout correction operation, the moveout programmer should generate an output which positions the head or heads at the desired position relative to the recording medium. However, where the moveout programmer and the recording medium are driven from separate and independent motive power sources, the problem of maintaining exactly the desired relationship between head movement and recording medium movement is very difficult because of the above-described nonlinearity of the required moveout correction and the consequent difficulty in accurately generating the desired head movement.

Broadly, the present invention contemplates methods and apparatus for removing normal moveout time variations from seismic traces utilizing a reproducible recording medium and recording and/or reproducing means which are mechanically maintained in a predeterminable relationship to the recording medium during the moveout removal operation. More particularly, the invention contemplates the use of a common motive power source mechanically connected to both the recording medium and the recording or reproducing head so that the recording medium and recording or reproducing head are effectively connected together. Thus, for every position of the recording medium, the recording or reproducing head must occupy a position relative to the medium determined by the nature of the mechanical connection between the recorder elements and the motive power source. The nature of this connection is designed in accordance with the normal moveout function obtaining in the surveyed area, so that the recording or reproducing head must always occupy the desired positions relative to the recording medium during the moveout removal operation. Thus, rather than attempting to correlate the movements of the recording medium and the head on a time basis, as is done in the prior art methods discussed above, the present invention correlates the recorder elements on a position basis in which the position of each element is dependent upon the position of the other element, thereby insuring that the desired correction is introduced at all times.

It is, therefore, an object of this invention to provide improved methods and apparatus for removing normal moveout time variations from seismic traces.

It is an additional object of the present invention to provide methods and apparatus for removing normal moveout time variations from seismic traces utilizing a recording medium and an associated recording or reproducing head which are mechanically driven from a common motive power source.

It is a further object of this invention to provide methods and apparatus for removing normal moveout time variations from seismic traces utilizing a recording medium and an associated recording or reproducing head which are mechanically connected to a common motive power source to maintain a predeterminable relationship between the positions of the medium and the head.

It is an additional object of this invention to provide methods and apparatus for removing normal moveout time variations from seismic traces in which the traces are first recorded on a reproducible recording medium and are then reproduced through reproducing means which are driven in accordance with the normal moveout function and which are driven from the same motive power source as the recording medium.

Figure 2:
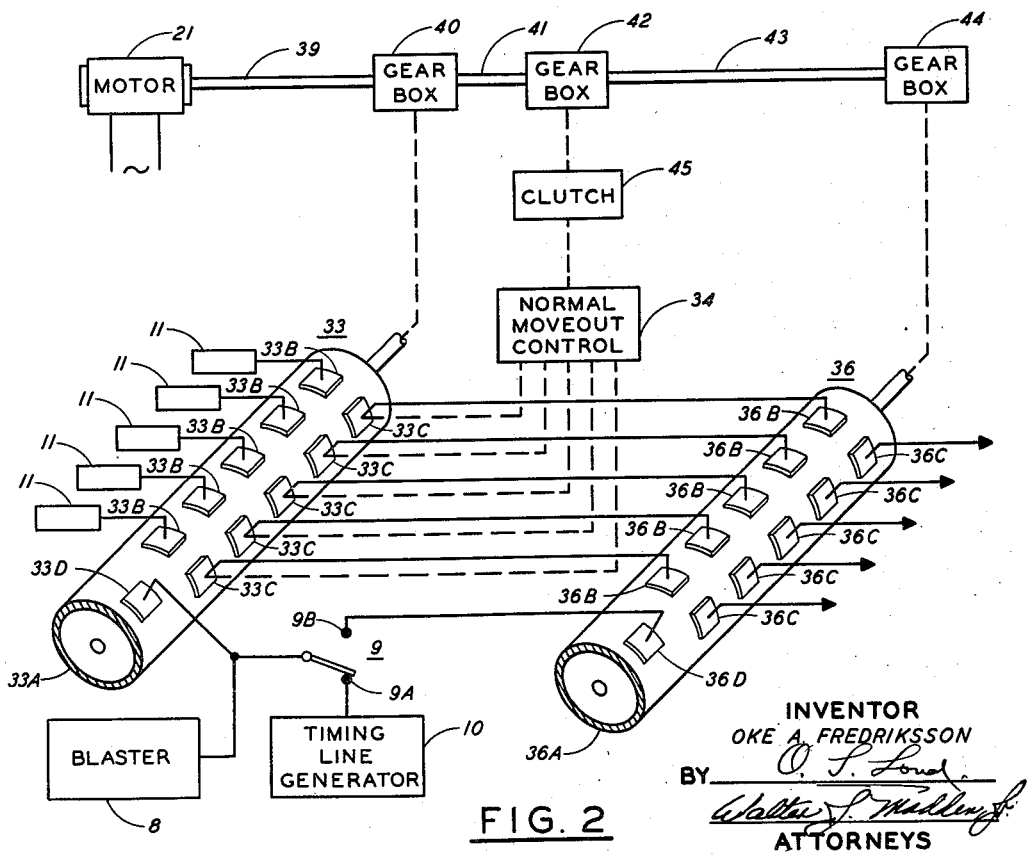

Objects and advantages other than those set forth above will be apparent from the following description when read in connection with the accompanying drawing, in which:

Fig. 1 illustrates one embodiment of the present invention in which the recording medium and a single recording head are driven from a common motive power source during recording to remove normal moveout, and Fig. 2 illustrates an alternate embodiment of the invention in which the seismic traces are first recorded on the reproducible recording medium and then the recording medium and the reproducing means are driven from a common motive power source during reproduction to remove normal moveout.

Referring to Fig. 1 by character of reference, numeral 8 designates a device for initiating creation of a seismic disturbance. Device 8 may be a blasting device for supplying current to a firing cap to detonate a charge of explosives, or device 8 may control the release of an elevated weight which is dropped to the earth to create the seismic disturbance. Numeral 11 designates a seismic wave detector or geophone which converts movement of the ground in response to the seismic disturbance into a seismic trace which is supplied through an amplifier 12 to a suitable recording device 13. Recorder 13 is preferably of the reproducible recording type in which information recorded thereon may be reproduced repeatedly and at will. Recorder 13 may have a recording medium 13A in the form of a layer of magnetizable material disposed around the periphery of a rotor and adapted to rotate beneath a recording head 13B and a reproducing head 13C. As medium 13A rotates, variations in the signal supplied to recording head 13B are recorded on medium 13A in the form of variations in the magnetization of medium 13A. The information recorded on medium 13A is reproduced through reproducing head 13C and supplied through an amplifier 14 to a suitable recording device 15. Recorder 13 is also provided with a timing line recording head 13D connected to a timing pulse generator 10 which supplies a series of reference timing pulses through contact 9A of a switch 9 for recording on medium 13A simultaneously with the seismic detector signals. A contact 9B of switch 9 connects timing line head 13D to recorder 15.

In the embodiment illustrated in Fig. 1, recording head 13B is movable about the periphery of medium 13A to effect variations in the position of head 13B relative to the time axis of medium 13A. In the normal moveout removal operation, recording head 13B is moved relative to medium 13A by a suitable normal moveout programming device including a cam 16 having a cam follower shaft 17 bearing against the cam and connected to recording head 13B to program the movement of head 13B in accordance with the shape and rotation of cam 16.

A common motive power source, such as a motor 21, is provided for driving the normal moveout programmer and the recording medium. Motor 21 drives a shaft 22 which, in turn, is connected to a gear box 23 having one output shaft 24 connected to cam 16 and having another output shaft 25 connected to a second gear box 26. Shaft 25 also has associated therewith suitable means for supplying a controlling pulse to blaster 8 indicative of a given rotative position of recording medium 13A. Such means may be in the form of a cam 30 which closes a switch in the input circuit to blaster 8. Gear box 26 has an output shaft 27 connected to the rotor on which recording medium 13A is mounted. Recording medium 13A and the normal moveout programmer comprising cam 16 and follower 17 are thus mechanically connected together through the associated gears and shafts so that movement of each element is dependent on the movement and position of the other element. It is assumed that motor 21 is of sufficient capacity to drive recording medium 13A and the normal moveout programming mechanism at a uniform speed even with the variable load from the normal moveout programmer. The constant speed is required since during a single recording the amount and rate of normal moveout removal is dependent on the time elapsed subsequent to the artificial seismic disturbance. The amount and rate of normal moveout removal being dependent on the angular position and angular velocity of cam 16, therefore, requires that this angular velocity and position be time dependent, an effect obtained with a constant speed motor.

In the operation of the embodiment illustrated in Fig. 1, it is assumed that the normal moveout time variations are to be removed during the recording operation as the signal is generated by detector 11. However, it will be obvious that this moveout removal may be accomplished by first recording the uncorrected signal on the reproducible recording medium and then performing the normal moveout correction by moving reproducing head 13C during the reproduction of the trace. Additionally, it will be apparent to those skilled in the art that although separate recording and reproducing heads are illustrated, these functions may be combined into a single head capable of both recording and reproducing, as is well known in the art.

With the equipment in readiness for operation, motor 21 is energized to start rotation of medium 13A and normal moveout cam 16. When cam 16 and medium 13A reach their respective position corresponding to the start of the seismic disturbance, cam 30 closes the switch contacts to energize blaster 8 for creating the seismic disturbance. It is essential that the disturbance be created at the correct instant so that cam 16 and recording medium 13A are in their correct positions for starting the normal moveout removal operation. Cam 16 is shaped in accordance with the normal moveout function obtaining in the area being surveyed to produce the desired movement of recording head 13B during recording of the seismic trace. Under usual conditions, the moveout time correction required will be largest shortly after the seismic disturbance, when the differences between the vertical travel distance from the shot point to a given reflecting horizon and back and the actual travel distance from the shot point to the given reflecting horizon and back to the detector are largest. It will be understood that the shape of cam 16 will vary in accordance with the particular moveout function obtaining and that differently shaped cams will be utilized for different normal moveout functions.

Thus, as medium 13A and cam 16 rotate, the position of recording head 13B is varied to alter the time sequence of the seismic detector signal recorded on medium 13A in accordance with the normal moveout function. During the seismic disturbance, timing line generator 10 supplies timing pulses to head 13D for recording on medium 13A simultaneously with the detector signals. Since medium 13A and cam 16 are mechanically connected together through gear boxes 23 and 26 and shafts 24, 25 and 27, for every position of recording medium 13A there exists only one position for recording head 13B, so that the desired relationship between recording medium 13A and recording head 13B is rigidly maintained throughout the moveout removal operation; that is, the mechanical connection of the recording medium and the recording head to a common motive power source makes it impossible for the two elements to have any but the desired position relative to each other, neglecting any back-lash in the gearing, and thus insures that the exact value of the desired correction is introduced into the recorded trace at all times. Recording medium 13A is driven at a constant speed by motor 21, so that the relative positions of the timing pulses on the recording medium are the same for different detector signals, thus insuring that the resulting signals may be accurately time correlated, and also to insure proper amounts and rates of normal moveout removal. The normal moveout-corrected trace recorded on medium 13A may then be reproduced through reproducing head 13C and supplied through amplifier 14 to recorder 15 where the trace may be analyzed or stored for further use in mixing or combining with other moveout-corrected traces. Switch 9 is moved to contact 9B to reproduce the timing pulses from the recording medium to recorder 15. It will be seen that this method provides much better correlation between the positions of the recording medium and the recording head than would result if the recording medium and the recording head were independently driven.

In the embodiment of Fig. 1, it was assumed that motor 21 was of sufficient capacity to drive recording medium 13A at a constant speed despite the variable load on the motor from the normal moveout programming mechanism. However, where the driving motor is not of sufficient capacity, particularly where a plurality of moveout programming mechanisms are to be simultaneously driven, it is desirable to first record the detector signals without normal moveout removed on a recording medium rotating at a constant speed. The reference timing lines will then all have the same relative positions for different recordings, thus insuring that the different recordings may be accurately time correlated. After recording the detector signals and timing pulses at a constant recording speed, reproduction of the signals and timing pulses may be accomplished and normal moveout removed from the detector signals through a programming mechanism driven in common with the recording medium. Thus, even though the recording medium speed varies during production owing to the variable load of the moveout programming mechanism, the reproduced timing pulses will be similarly varied, so that the detector signals will always bear the same relationship to the timing pulses regardless of these variations. In effect, the signals, timing pulses, and amount and rate of normal moveout removal will be position dependent, rather than time dependent as in the case of separate drives or in the case of recording at varying speeds.

Fig. 2 illustrates an alternate embodiment of the invention adapted to simultaneously remove normal moveout time variations from a plurality of seismic traces. In Fig. 2, reference numeral 33 designates a reproducible recording device having a recording medium 33A in the form of a layer of magnetizable material disposed around the periphery of a rotor. Recorder 33 is provided with a plurality of recording heads 33B for recording a plurality of seismic traces from seismic wave detectors 11 on medium 33A. A timing pulse recording head 33D is connected to timing pulse generator 10 through contact 9A of switch 9 to provide reference timing marks on medium 33A simultaneously with recording of the seismic detector signals. Blaster 8 is also connected to head 33D to provide on medium 33A an indication of the instant of creation of the seismic disturbance. Recorder 33 is also provided with a plurality of reproducing heads 33C, each of which is mechanically connected to a normal moveout programmer 34. The output from reproducing heads 33C may be supplied to a second reproducible recorder 36 having a recording medium 36A, recording heads 36B and reproducing heads 36C.

A common motive power source in the form of motor 21 is provided to drive recording media 33A and 36A and normal moveout programmer 34. Motor 21 has an output shaft 39 connected to gearing 40 to drive medium 33A. A shaft 41 from gearing 40 is connected to gearing 42 to drive normal moveout programmer 34 through suitable clutching apparatus 45. The other output of gearing 42 is connected through a shaft 43 to gearing 44. The output of gearing 44 is connected to the rotor on which recording medium 36A is mounted.

In operation, prior to creation of the seismic disturbance, motor 21 may be energized to drive recording media 33A and 36A. At this stage, clutch 45 is disengaged from normal moveout programmer 34 so that the programmer is not operating, thus removing the load of programmer 34 and insuring that motor 21 operates at a substantially constant speed during the recording operation. The seismic disturbance may then be created by energization of blaster 8, and an indication of the instant of creation of the disturbance is supplied from blaster 8 to recording head 33D through any suitable well-known time-break recording means. The signals generated by the different detectors 11 in response to the seismic disturbance are then recorded on medium 33A through the associated recording heads 33B. During this recording, timing line generator 10 supplies timing pulses to head 33D for recording on medium 33A simultaneously with the detector signals.

After recording the detector signals, clutch 45 is engaged to connect normal moveout programmer 34 to motor 21 for the normal moveout operation. In engaging programmer 34, the position on medium 33A of the timebreak signal is utilized to correlate the start of the seismic record on medium 33A with the corresponding position of programmer 34, so that the beginning of the seismic record is under reproducing heads 33C and programmer 34 is at the beginning of its movement when reproduction of the seismic signals is commenced. After the correlation, motor 21 is energized to drive recording media 33A and 36A and moveout programmer 34. Programmer 34, in turn, drives the different reproducing heads 33C by different amounts to introduce the required normal moveout correction into the reproduced signals. The reproduced, moveout-corrected signals from heads 33C are supplied to corresponding recording heads 36B of recorder 36. During this reproduction and normal moveout removal, the time break and the timing lines recorded on medium 33A are reproduced through head 33D and supplied through contact 9B of switch 9 to head 36D of recorder 36.

Thus, normal moveout programmer 34 and recording media 33A and 36A are driven by common motive power source 21, so that movement of each of these devices is dependent on movement of the associated devices, and for any position of one of the devices, the other two devices must necessarily assume definite, predeterminable positions by virtue of the mechanical connection among the three devices. Even if the speed of motor 21 varies during the reproduction and moveout removal operation, both the reproduced timing lines and the seismic signals will be similarly affected by these speed variations so that the seismic signals will always bear the same relationship to the timing lines except for the changes introduced by the normal moveout removal. In effect then, the seismic signals, timing lines, and the amount and rate of normal moveout removal will be position dependent rather than time dependent.

Although but a few illustrative embodiments of the present invention have been described, it will be apparent to those skilled in the art that various changes and modifications may be made therein without departing from the spirit of the invention or the scope of the appended claims.

I claim:

1. Apparatus for removing normal moveout from a plurality of seismic traces comprising a first rotatable reproducible recording medium on which said traces are recorded, a plurality of reproducing devices associated with said first medium and movable relative to the time axis of said medium, a second recording medium, a motive power source, first gear means for mechanically connecting said first medium to said motive power source, a normal moveout programmer mechanically connected to said reproducing devices for moving each of said reproducing devices relative to the time axis of said first medium in accordance with the normal moveout functions of each of said traces, second gear means connecting said motive power source to the input of said normal moveout programmer to supply power to said programmer, third gear means connecting said source to said second medium, and means for reproducing said seismic traces through said reproducing devices and supplying said reproduced traces to said second medium as said recording media and said reproducing devices move to vary the time sequences of the traces recorded on said second medium in accordance with said normal moveout functions.

2. Apparatus for removing normal moveout from a plurality of seismic traces comprising a first rotatable reproducible recording medium on which said traces are recorded, a plurality of reproducing devices associated with said first medium and movable relative to the time axis of said medium, a second rotatable reproducible recording medium, a motive power source, first gear means for mechanically connecting said first medium to said motive power source, a normal moveout programmer mechanically connected to said reproducing devices for moving each of said reproducing devices relative to the time axis of said first medium in accordance with the normal moveout functions of each of said traces, second gear means connecting said motive power source to the input of said normal moveout programmer to supply power to said programmer, third gear means connecting said source to said second medium, and means for reproducing said seismic traces through said reproducing devices and supplying said reproduced traces to said second medium as said recording media and said reproducing devices move to vary the time sequences of the traces recorded on said second medium in accordance with said normal moveout functions.

3. Apparatus for removing normal moveout from a plurality of seismic traces comprising a first rotatable reproducible recording medium on which said traces are recorded, means for producing a series of reproducible timing lines on said first medium, a plurality of reproducing devices associated with said first medium and movable relative to the time axis of said medium, a second recording medium, a motive power source, first gear means for mechanically connecting said first medium to said motive power source, a normal moveout programmer mechanically connected to said reproducing devices for moving each of said reproducing devices relative to the time axis of said first medium in accordance with the normal moveout functions of each of said traces, second gear means connecting said motive power source to the input of said normal moveout programmer to supply power to said programmer, third gear means connecting said source to said second medium, means for reproducing said timing lines from said first medium for recording on said second medium, and means for reproducing said seismic traces through said reproducing devices and supplying said reproduced traces to said second medium as said recording media and said reproducing devices move to vary the time sequences of the traces recorded on said second medium in accordance with said normal moveout functions.

References Cited in the file of this patent

UNITED STATES PATENTS

| | | |
|---|---|---|
| 2,243,729 | Ellis | May 27, 1941 |
| 2,429,236 | Potter | Oct. 21, 1947 |
| 2,440,971 | Palmer | May 4, 1948 |
| 2,671,375 | Boucher | Mar. 9, 1954 |
| 2,683,254 | Anderson | July 6, 1954 |